April 11, 1967

F. J. HOAR 3,313,680

SYSTEM FOR RECOVERING RELIEF GASES FROM A
SULPHITE PULP DIGESTER

Filed Dec. 4, 1963

INVENTOR.
FRANCIS J. HOAR

BY

ATTORNEY 3,313,680
SYSTEM FOR RECOVERING RELIEF GASES FROM A SULPHITE PULP DIGESTER
Francis J. Hoar, % F. J. Hoar Associates, 49½ Maple St., Box 69, Massena, N.Y. 13662
Filed Dec. 4, 1963, Ser. No. 328,035
3 Claims. (Cl. 162—239)

The present invention relates to the manufacture of papermaking pulp, and more particularly to the manufacture of acid for use in the digester employed for producing the pulp.

For years the sulphite paper mills of the world blasted their relief gases over the countryside, wasting these gases and polluting the atmosphere. Progress has been made, however, in that methods have been developed for absorbing the relief gases into the acid used in the sulphite process, and these developments have culminated in complete separation of the production of raw acid from the recovery of the $SO_2$. In such processes, for instance, the low pressure relief gas from the digester was absorbed directly in a reclaiming tank carrying a constant head of acid. The relief line carried the gas from the digester on low pressure relief as well as the overgas from a high pressure cooking acid accumulator.

Pre-cooling of the relief gas was handled by a heat exchanger which under periods of high relief volume during summer conditions resulted in a temperature of the gas entering the reclaiming tank of as much as 80° C. As a result, lack of absorption put heavy gas loads on the suction fan of the acid making system to which the reclaiming tank relieved, and the storage acid temperature frequently ran at 40° C. Since the gas absorption is in inverse relation to the temperature, the cooking acid total, except in mid-winter, averaged barely 5%. Sulphur consumption was high; and the acid plant was unable to produce a cooking acid of the strength necessary to meet the increasing emphasis on quality pulp and to permit improvement in cooking technique.

One object of the present invention is to provide a more efficient system for recovering the digester relief gases.

Another object of the invention is to minimize peaks of overgas returned to the plant for manufacturing raw acid, and to reduce the surge loads on the conventional limestone towers used in the manufacture of the acid.

Another object of the invention is to provide a system for recovering the relief gases from the digester which will permit uniformity of operation of the raw acid absorption towers used in the production of the acid employed in the digester. To this end, another object of the invention is to reduce the $SO_2$ strength of the overgas from the pressure recovery tower to a strength comparable to burner gas with subsequent uniformity of operation in the limestone towers.

Another object of the invention is to provide a system for recovering the digester relief gases which will eliminate recovery of such gases in a reclaiming tank, and permit maintenance of the storage acid in a quiescent state.

Another object of the invention is to provide a system for recovery of the relief gases from the digester which will permit fortification of the raw acid consistent with operating requirements, especially of seasonal changes in temperature of the water available for the acid making.

Another object of the invention is to provide a system for absorption of relief gases which will permit savings in the amount of sulphur required for production of the acid used in the digester.

Another object of the invention is to provide a system for the recovery of digester relief gases which will permit start-up of a cooking operation, after shut-down, with acid of the desired strength and which will practically eliminate any drop in acid strength over a week-end shut-down.

Another object of the invention is to provide a system for recovery of digester relief gases which will eliminate fluctuation in the suction load on the gas fan during acid making.

Another object of the invention is to provide a system for absorbing relief gases which will permit raising the cooking acid strength without increasing the specific gravity of the raw acid.

Another object of the invention is to provide a system for recovery of digester relief gases which will permit flexible control of both the combined and the total $SO_2$ ratio in the digester acid.

Another object of the invention is to provide a recovery system of the character described with which the strength and quality of the raw acid may readily be regulated.

Other objects of the invention will be apparent hereinafter from the specification and from the recital of the appended claims particularly when read in conjunction with the accompanying drawing.

The present invention relates to a system of preparing bisulphite cooking acid solution of prescribed strength and chemical quality according to specifications, wherein a pressure recovery tower serves as a regulating throttle on overgas to the raw acid making towers.

In the method of the present invention the overgas from the various recovery stage vessels is returned to a pressure recovery tower, and the gas from the pressure recovery tower is discharged directly to the bisulphite raw acid making system. Overgas from the pressure recovery tower has approximately the same $SO_2$ gas strength as burner gas; and this overgas is directed to the raw acid system, usually to the pressure side of the gas fan supplying the acid making towers. The system, which is designated as a "split phase" system, because the flows of the relief gas and fortified acid are not connected in a strictly series counter-flow arrangement, eliminates stripping in successive vessels by the overgas from the previous high pressure vessel. These overgases are absorbed in the recovery tower, in which they flow counter to the raw acid at relatively low $SO_2$ concentrations and temperatures. The cycling of inert gases produced in the cooking process, if returned to the acid storage tanks, either under pressure or at atmospheric pressure, would strip $SO_2$ from the acid in these tanks. The stripping effect is completely eliminated by removal of these inert gases in the overgas from the pressure recovery tower. Ample quantities of cold, low strength raw acid from the acid-making system are made available in the pressure recovery tower to absorb the $SO_2$ contained in the pressure storage tank overgas and also in the digester relief gas.

The system of the present invention is a distinct innovation from prior practice in digester overgas absorption because the system eliminates all overgas absorption in the reclaiming tank or the raw acid storage tank.

The system of the present invention eliminates the need for a gas holder and also for an absorption tower. The recovery plant is used to recover $SO_2$ to fortify the raw acid to obtain a desirable cooking acid.

In cold cooking acid storage plants, the pressure recovery tower is capable of handling 100% total of digester relief gases and fortifies the raw acid to cold cooking acid for the digester charge, with elimination of any $SO_2$ gas stripping in the solution in the reclaimed or fortified acid storage.

The system of this invention, in actual performance, is outstanding in improved cooking conditions, economy of steam operation in digester cooking, reduced chemical consumption due to production of lower strength raw acid, etc.

Figure 1:
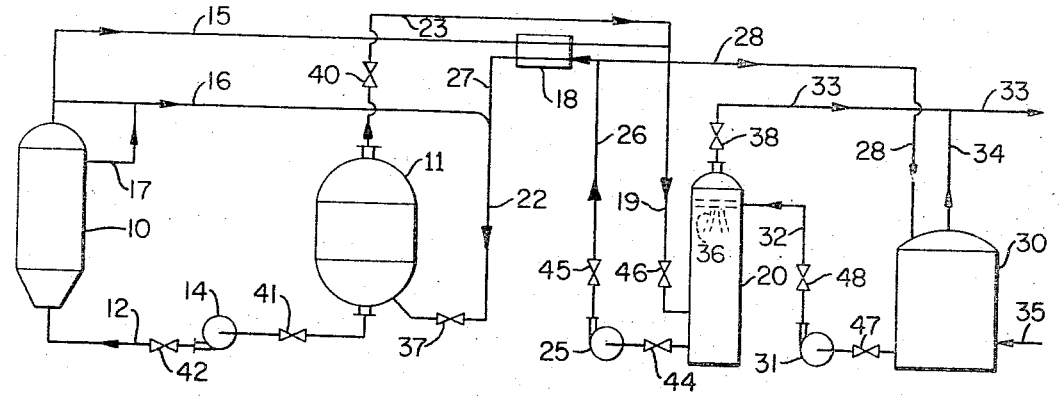
FIG. 1 is a diagrammatic view of a recovery system built according to one embodiment of this invention.

Referring now to the drawing by numerals of reference, and first to the embodiment disclosed in FIG. 1, 10 denotes a conventional digester for converting pulpwood chips into papermaking pulp. The acid for the digester is delivered to the bottom of the digester from a high pressure hot acid storage tank 11 through piping 12 by means of a pump 14. Low pressure and high pressure relief pipes 15 and 16 are connected to the top of the digester; and a side relief pipe is connected to the digester below its top to communicate with the high pressure pipe 16. The low pressure relief pipe 15 passes through a cooler or heat exchanger 18 and delivers the cooled low pressure relief gases through a pipe 19 to the pressure recovery tower 20 adjacent the bottom of that tower.

The high pressure relief gases from the digester are delivered by pipes 16 and 22 to the bottom of the high pressure hot acid storage tank 11. The relief gases from this storage tank are delivered by piping 23 into the pipe 19 which communicates with the pressure recovery tower 20.

The pressure recovery tower 20 contains chemical packing material of known types, for instance, cross partition rings topped by Raschig rings, established by the design dimensions of the tower unit and the gas volume and acid volume being processed in the pressure recovery tower unit.

The acid is pumped from the bottom of the pressure recovery tower 20 by means of a pump 25 through piping 26, the heat exchanger 18, the piping 27 and 22 into the bottom of the storage tank 11. The heat exchanger builds up the temperature of the acid and cools down the low pressure relief gases. The excess acid flows through the piping 28 into the raw acid storage tank 30. Acid is continuously pumped from the bottom of this storage tank 30 by means of a pump 31 through piping 32 into the top of the pressure recovery tower whence it is sprayed by nozzles 36 over the chemical packing material. It flows in counter-flow to the low pressure relief gases from the top of the digester and to the gases from the top of the high pressure hot acid storage tank 11.

The top of the pressure recovery tower is connected by piping 33 to the discharge side of the fan or prime moving element of the conventional acid-making plant; and the raw acid storage tank is also connected with this side of this fan by the pipe 34 which communicates with the piping 33.

The raw acid is delivered from the acid plant to the raw acid storage tank 30 through piping 35.

When the desired quality has been achieved in the acid flowing to the digester through the pipe 12, the valve 37, which controls the pressure at which gases are relieved from the digester through the pipe 16, may be closed, shutting off flow of the high pressure relief gases from the digester to the high pressure hot acid storage tank 11. The overgas in the digester all flows then to the pressure recovery tower. This accommodates the low pressure overgas from the digester. This results in recovery of the waste $SO_2$ gases with control in this tower effective for quality control of raw acid-making and also for fortification of the raw acid made in the acid-making plant.

With this system fortifying overgas passes, counter-currently in split parallel flow with controlled quantities of overgas, to high pressure storage tank 11 and then to the pressure recovery tower controlling the quantity of gas absorbed and also the strength of this overgas $SO_2$ to the conventional acid towers for preparation of raw acid of different strengths as required or desired for pulpwood processing purposes. Control of the strength of the acid in the acid-making plant is achieved by regulating the outlet gases from the pressure recovery tower. For this purpose a pressure control valve 38 is provided in the outlet line 33 from the pressure recovery tower 20.

The valves 40 and 46 control the pressure of the overgas flowing to the recovery tower 20. The valves 41 and 42 control the rate of flow of acid to the digester 12. The valves 44 and 45 permit control of the acid from the recovery tower to the storage tank 11; and the valves 47 and 48 permit control of the flow of raw acid from storage tank 30 to the recovery tower 20. Valve 46 permits control of the pressure of the low pressure relief gas.

The pressure recovery tower 20 contains, as stated, chemical packing material of chemical stoneware furniture, or other type of chemical packing, above which is inserted the inlet of the acid supply pipe 32, which feeds the spray nozzles 36. These give complete coverage of the cross section area of the tower and may operate, for instance, at approximately 300 g.p.m. This input rate can be held constant throughout the week, the excess over-acid making requirements being recycled to the storage tank. This is a most desirable and advantageous feature of the pressure recovery tower. As the acid demand for the pulp-making diminishes toward the end of the last shift of the week, the recovery rate of the low pressure relief gas is in no way disturbed. The 300 g.p.m. rate of flow through the tower continues to absorb the heavy volume of gas encountered at this phase of the pre-shutdown digester relief. The majority of this fortified acid returns to the storage tank providing a high level of storage acid strength for the subsequent start-up. This shut-down procedure enables practical elimination of any drop in acid strength over a weekend shut-down.

Figure 2:
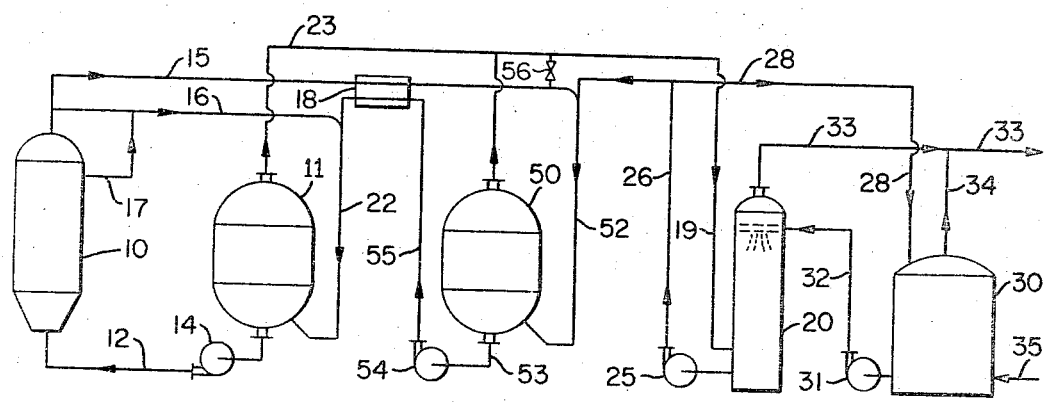
FIG. 2 is a diagram of a recovery system built according to another embodiment of the invention.

A somewhat different embodiment of the invention is illustrated in FIG. 2. Identical reference numerals in this figure designate the same parts as in FIG. 1. Here a low pressure storage tank 50 is used in addition to a high pressure storage tank 11. The acid flow is from the pressure recovery tower 20 serially through the pump 25, the pipe 26, the line 52, the low pressure storage tank 50, the line 53, the pump 54, line 55, the heat exchanger 18, the line 22 to the hot acid high pressure storage 11, the pump 14 and the line 12 to the bottom of the digester.

Fortifying of the overgas is here handled in split phase parallel flow counter-currently to the acid with a quantity of the gas going to the high pressure storage tank 11 through lines 16 and 22. When the quantity point has been reached this flow may be cut off. The overgas in the digester 10 is conveyed to the low pressure storage tank 50 when the high pressure stage condition is satisfied to such a point that the pressure in the digester 10 is reduced to a low pressure point. The pressure recovery tower 20 accommodates the low pressure overgas from the digester which flows through the heat exchanger to the tower. This results in recovery of the waste $SO_2$ gases, with control in the tower 20 effective for quality control of raw acid-making and also for fortification of the raw acid made in the acid-making plant.

The pressure recovery tower 20 is connected by the pump 25, line 26, and line 52 with the low pressure storage tank 50. The line 16, as before, conveys the high pressure overgas from the digester to the line 22 which is connected with the high pressure storage tank 11. The line 55 connects with the same line 22.

In this respect fortifying overgas passes counter-currently in split parallel flow in controlled quantities to the high pressure storage tank 11 and also the the low pressure tank 50, and thence to the overgas pressure recovery tower 20 controlling the quantity of absorption and the strength of the overgas $SO_2$ which flows to the acid-making plant.

A manually adjustable valve 56 permits interflow of the low-pressure relief overgas from digester 10 and the overgas from high pressure hot acid tank 11 to control flow of overgas to low pressure hot acid storage tank 50 and recovery tower 20. The several valves 40, 41, 42, 44, 45, 46, 47, 48 have been omitted from FIG. 2 for simplicity in illustration. They would be used.

Figure 3:
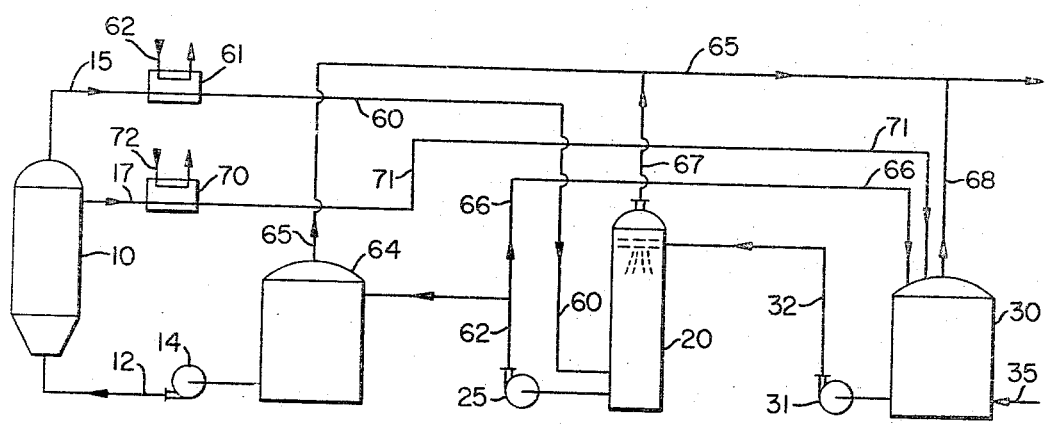
FIG. 3 is a diagram of a recovery system built according to a still further embodiment of the invention.

A further embodiment of the invention is illustrated in FIG. 3. Here the pressure recovery tower 20 is capable of handling 100% total of the digester relief gases, and fortifies the raw acid to cold cooking acid for the digester charge, with elimination of any SO₂ gas stripping in the solution in the reclaimed or fortified acid storage.

The overgas flows from the top of the digester 10 direct to the pressure recovery tower through a line 60, passing through a heat exchanger 61 which is cooled by water flowing through the pipe 62. The raw acid flowing from the raw acid plant into the raw acid storage is pumped by a pump 31 through line 32 into the pressure recovery tower 20; and the fortified acid is pumped from the pressure recovery tower by pump 25 through a line 62 into a fortified acid storage tank 64 whence it is pumped by pump 14 through line 12 to the bottom of the digester. The overflow acid from the fortified acid storage tank 64 is conducted by the line 65 to the acid manufacturing plant. Acid pumped from the pressure recovery tower is also carried by line 66 into the raw acid storage tank 30. The gas from the pressure recovery tower is carried by lines 67 and 65 to the acid manufacturing plant; and the acid from the raw acid storage tank 30 can flow through pipe 68 and line 65 to the acid-making plant. The high pressure acid from the side relief of the digester flows through the heat exchanger 70 and line 71 into the raw acid storage tank 30. The heat exchanger 70 again is cooled by the water flowing through the line 72 of the heat exchanger.

Because of the efficient absorption of relief gases in the system of the present invention, savings in sulphur up to 10% have been experienced.

From the preceding description it will be seen that the tower 20 is not only a recovery unit but also a control unit governing the primary acid-making plant. By regulating the pressure in the pressure recovery tower, the acid produced can be regulated. The pressure recovery tower becomes an absorbing medium building up the strength of the acid. Control of the strength of the acid in the raw acid tower of the acid-making plant is accomplished by regulating by valve 38 the outlet gas from the pressure recovery tower 20. The operating pressure of the recovery tower may be varied from 0 to 15 lbs. p.s.i. permitting fortification of the raw acid consistent with operating requirements. Seasonal changes of temperature in the water available for acid making are compensated for by operating flexibility of the pressure recovery tower system. The system can also be used as an instrument to control the combined acid. By merely raising or lowering the tower pressure it is possible with the system of the present invention to adjust the combined-free SO₂ ratio for any given specific gravity of raw acid, within reasonable limits.

The strength of the overgas from the pressure recovery tower expressed in percentage of SO₂ by volume may be increased by reducing the pressure in the tower unit and, converesly, strength of the overgas may be decreased by raising the pressure in the recovery tower unit. The overgas from the pressure recovery tower goes to the fan, or prime-moving element, in the acid-making plant, thus controlling the strength of the cooking acid produced, and controlling the raw acid quality and strength. All of the digester relief gases are absorbed in the recovery tower, not in acid storage. This eliminates gas recovery in the raw acid storage vessels. The advantage is that there is no stripping by putting in weak SO₂. The overgas from the pressure recovery tower flows, as stated, to the pressure side of the fan of the acid-making plant; and it is not used for stripping as has heretofore been the case.

The absorption of digester relief gases in a packed tower has been proven to be more efficient than the recovery of these gases in reclaiming tanks, in which the mass absorption principle is employed. The gas retention space in the recovery tower minimizes the peaks of overgas returned to the raw acid plant, and reduces surge loads on the limestone towers of the acid-making system. The pressure recovery tower will absorb a larger percentage of the overgas from the digesters than is possible with towers operated under atmospheric pressure. The amount of overgas from the digester is subject to wide fluctuations, depending upon the size and number of digesters, etc. With a recovery tower system, operating at 15 lbs. pressure, for instance, about twice the amount of SO₂ gas can be absorbed in the raw acid as if the tower operated at atmospheric pressure.

The strength of the gas leaving the recovery tower will also be half of what it would be under atmospheric pressure. If the raw acid alone cannot absorb all the gas, before the saturation point is reached, more gas can be absorbed by recirculating a certain amount of acid from storage to the recovery tower. This acid is always much weaker than the acid leaving the recovery tower.

The split phase system, utilizing a pressure recovery tower, can be adapted for use with any existing recovery plant, including cold acid systems, or systems with one or two stages of hot acid pressure storage.

While the invention has been described in connection with three different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a system for recovering relief gases from a sulphite pulp digester,
    (a) a digester,
    (b) a recovery tower,
    (c) a high pressure storage tank,
    (d) a raw acid storage tank,
    (e) means for conducting high pressure relief gas from said digester to said high pressure storage tank,
    (f) means for conducting relief gases from said high pressure storage tank into said recovery tower adjacent the bottom thereof,
    (g) a heat exchanger,
    (h) means for conducting low pressure relief gas from said digester through said heat exchanger into said recovery tower adjacent the bottom thereof,
    (i) means for conducting acid from the bottom of said recovery tower through said heat exchanger into said high pressure storage tank and into said raw acid storage tank,
    (j) means for conducting relief gas from the top of said recovery tower to an acid manufacturing plant,
    (k) means for adjustably controlling the pressure of the relief gas flowing from said recovery tower to said acid manufacturing plant,
    (l) means for conducting acid from said acid manufacturing plant into said raw acid storage tank, and
    (m) means for conducting acid from said raw acid storage tank into said recovery tower adjacent the top thereof to flow counter to the gas entering said recovery tower.

2. In a system for recovering relief gases from a sulphite pulp digester,
    (a) a digester,
    (b) a recovery tower,
    (c) a high pressure storage tank,
    (d) a low pressure storage tank,
    (e) a raw acid storage tank,
    (f) means for conducting high pressure relief gas from said digester to said high pressure storage tank,
    (g) a heat exchanger,
    (h) means for conducting relief gases from both said high pressure and said low pressure storage tanks to said recovery tower adjacent the bottom thereof,
    (i) means for conducting low pressure relief gases from said digester through said heat exchanger to said low pressure storage tank,
(j) means including an adjustable valve connecting the two last-named means and controlling communication between them,
(k) conduit means connecting the bottom of said low pressure storage tank through said heat exchanger with said high pressure storage tank,
(l) means for conducting acid from the bottom of said recovery tower both into said low pressure storage tank and into said raw acid storage tank,
(m) means for conducting relief gases from the top of said recovery tower and from said raw acid storage tank to an acid manufacturing plant,
(n) valve means for controlling the pressure of the relief gases flowing from the top of said recovery tower into the last-named conducting means, and
(o) means for conducting acid from said raw acid storage tank into said recovery tower adjacent the top thereof to flow counter to the gas entering the recovery tower.

3. In a system for recovering relief gases from a sulphite pulp digester,
(a) a digester,
(b) a recovery tower,
(c) a fortified acid storage tank,
(d) a raw acid storage tank,
(e) means for conducting relief gases from the top of said digester into said recovery tower adjacent the bottom thereof,
(f) means for cooling said gases during their passage through said conducting means,
(g) conduit means connecting said digester below its top with said raw acid storage tank to conduct fluid from said digester into said raw acid storage tank,
(h) means for cooling the fluid during its passage through said conduit means,
(i) means for supplying acid from said raw acid storage tank to said recovery tower adjacent the top thereof for flow counter to the relief gases entering said tower,
(j) means for conducting acid from said recovery tower both into said fortified acid storage tank and into said raw acid storage tank,
(k) means for conducting relief gases from said fortified acid storage tank and from said recovery tower to an acid manufacturing plant, and
(l) means for controlling the pressure of the relief gases flowing from said recovery tank into the last-named conducting means.

References Cited by the Examiner
UNITED STATES PATENTS

| | | | |
|---|---|---|---|
| 1,263,486 | 4/1918 | Thorne | 162—239 |
| 2,152,267 | 3/1939 | Merrill | 162—239 X |
| 2,402,895 | 6/1946 | Jenssen | 162—239 |

DONALL H. SYLVESTER, *Primary Examiner.*

HOWARD R. CAINE, *Examiner.*